(12) United States Patent
Rodrigues et al.

(10) Patent No.: US 11,635,567 B1
(45) Date of Patent: Apr. 25, 2023

(54) THERMALLY MODULATED PHOTONIC SWITCH AND ASSOCIATED METHODS

(71) Applicant: Toyota Motor Engineering & Manufacturing North America, Inc., Plano, TX (US)

(72) Inventors: Sean P. Rodrigues, Ann Arbor, MI (US); Yuqing Zhou, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/524,911

(22) Filed: Nov. 12, 2021

(51) Int. Cl.
   *G02B 6/12* (2006.01)
(52) U.S. Cl.
   CPC .............. *G02B 6/12033* (2013.01); *G02B 2006/12038* (2013.01); *G02B 2006/12061* (2013.01); *G02B 2006/12145* (2013.01)
(58) Field of Classification Search
   CPC ...... G02B 6/12033; G02B 2006/12038; G02B 2006/12061; G02B 2006/12145
   See application file for complete search history.

(56) References Cited

U.S. PATENT DOCUMENTS

| | | | |
|---|---|---|---|
| 10,862,610 B1 * | 12/2020 | Schubert | G06F 30/367 |
| 2020/0018714 A1 * | 1/2020 | Carr | G02B 6/107 |
| 2021/0132401 A1 * | 5/2021 | Zeng | G02B 6/125 |

FOREIGN PATENT DOCUMENTS

| | | |
|---|---|---|
| WO | 0155780 A2 | 8/2001 |
| WO | 0167166 A1 | 9/2001 |

OTHER PUBLICATIONS

R. Christiansen and O. Sigmund, "Inverse Design in Photonics by Topology Optimization: Tutorial," Journal of the Optical Society of America B, vol. 38, No. 2, Feb. 2021, available at https://www.osapublishing.org/DirectPDFAccess/C01664E3-4FF9-4830-B849D971982C4C23_446780/josab-38-2-496.pdf?da=1&id=446780&seq=0&mobile=no.
"Inverse Design of Photonics Nanoscale and Quantum Photonics Lab," available at https://nqp.stanford.edu/inverse-design-photonics.

(Continued)

*Primary Examiner* — Ellen E Kim
(74) *Attorney, Agent, or Firm* — Christopher G. Darrow; Darrow Mustafa PC

(57) ABSTRACT

Embodiments of a thermally modulated photonic switch are presented herein. One embodiment comprises a topology-optimized structure that includes dispersed silicon and silicon dioxide. This topology-optimized structure includes an input waveguide, a first output waveguide, and a second output waveguide. The topology-optimized structure routes a light beam from the input waveguide to the first output waveguide, when the topology-optimized structure is at a first predetermined temperature that causes a refractive index of the silicon in the topology-optimized structure to assume a first predetermined value, and the topology-optimized structure routes a light beam from the input waveguide to the second output waveguide, when the topology-optimized structure is at a second predetermined temperature that causes the refractive index of the silicon in the topology-optimized structure to assume a second predetermined value that is distinct from the first predetermined value.

20 Claims, 6 Drawing Sheets

(56) References Cited

OTHER PUBLICATIONS

Q. Zhao et al., "Compact and Broadband 1×4 Optical Switch Based on W2 Photonic Crystal Waveguides," IEEE Photonics Journal, vol. 8, No. 5, Oct. 2016, available at https://ieeexplore.ieee.org/stamp/stamp.jsp?arnumber=7572961.

H Cai et al., "A Thermo-Optic Photonic Switch," 2010 Photonics Global Conference, abstract linked at https://eeexplore.ieee.org/abstract/document/5706075.

Q. Zhao et al., "Compact Thermo-Optic Switch Based on Tapered W1 Photonic Crystal Waveguide," IEEE Photonics Journal, vol. 5, No. 2, Apr. 2013, found at https://ieeexplore.ieee.org/stamp/stamp.jsp?arnumber=6466349.

X. Tu et al., "State of the Art and Perspectives on Silicon Photonic Switches," Micromachines, Jan. 13, 2019, available at https://www.mdpi.com/2072-666X/10/1/51/pdf.

GP750 Fiber Optic Test Platform DiCon Fiberoptics, available at https://www.diconfiberoptics.com/products/gp750.php.

Multi-Mode Interferometers (MMI's), available at https://picwriter.readthedocs.io/en/latest/components/mmis.html.

S. Molesky et al. "Outlook for inverse design in nanophotonics." arXiv: 1801.06715 [physics.optics] Jan. 20, 2018.

\* cited by examiner

THERMALLY MODULATED PHOTONIC SWITCH AND ASSOCIATED METHODS

TECHNICAL FIELD

The subject matter described herein relates in general to photonic switches and, more specifically, to a thermally modulated photonic switch and associated methods.

BACKGROUND

Photonic switches—devices that route a light beam from an input waveguide to a specific output waveguide in response to a control input—are used in a variety of applications such as communications, optical computing, analog photonics, photonic processing, and optical neural networks. In some applications, it is particularly important for a photonic switch to be compact in size, but many conventional photonic switches do not meet the target size specifications for those applications.

SUMMARY

Embodiments of a thermally modulated photonic switch are presented herein. In one embodiment, a thermally modulated photonic switch comprises a topology-optimized structure that includes dispersed silicon and silicon dioxide. This topology-optimized structure includes an input waveguide, a first output waveguide, and a second output waveguide. The topology-optimized structure routes a light beam from the input waveguide to the first output waveguide, when the topology-optimized structure is at a first predetermined temperature that causes a refractive index of the silicon in the topology-optimized structure to assume a first predetermined value, and the topology-optimized structure routes a light beam from the input waveguide to the second output waveguide, when the topology-optimized structure is at a second predetermined temperature that causes the refractive index of the silicon in the topology-optimized structure to assume a second predetermined value that is distinct from the first predetermined value.

Another embodiment of a thermally modulated photonic switch comprises a topology-optimized structure that includes dispersed silicon and silicon dioxide. This topology-optimized structure includes an input waveguide and N output waveguides. The topology-optimized structure routes a light beam from the input waveguide to a particular one of the N output waveguides, when the topology-optimized structure is at a corresponding one of N distinct predetermined temperatures that causes a refractive index of the silicon in the topology-optimized structure to assume a corresponding one of N distinct predetermined values.

Another embodiment is a method of thermally modulated photonic switching. The method comprises inputting a light beam to an input waveguide of a topology-optimized structure that includes dispersed silicon and silicon dioxide, wherein the topology-optimized structure includes N output waveguides. The method also includes routing the light beam from the input waveguide to a particular one of the N output waveguides by adjusting a temperature of the topology-optimized structure to a corresponding one of N distinct predetermined temperatures that causes a refractive index of the silicon in the topology-optimized structure to assume a corresponding one of N distinct predetermined values.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
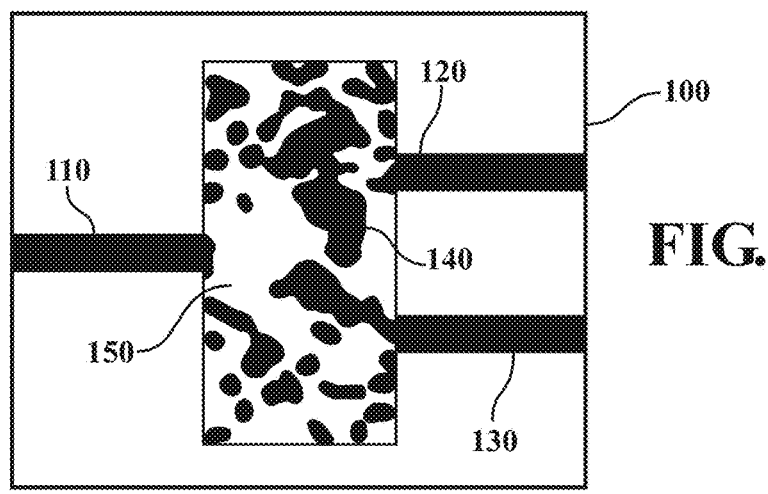
FIG. 1A illustrates a topology-optimized (TO) structure in a thermally modulated photonic switch, in accordance with an illustrative embodiment of the invention.

In various embodiments disclosed herein, a thermally modulated photonic switch (hereinafter sometimes referred to as a "photonic switch") is constructed through inverse-design techniques. The desired dimensions and performance characteristics are input to a computerized inverse-design algorithm to produce a topology-optimized structure that satisfies the desired dimensions and performance characteristics. In one embodiment, a 1×2 (one-input, two-output) thermally modulated photonic switch comprises a topology-optimized (TO) structure that includes dispersed silicon (Si) and silicon dioxide ($SiO_2$) distributed in a nontrivial manner as a result of the inverse-design process. In this embodiment, the TO structure includes an input waveguide, a first output waveguide, and a second output waveguide. The topology-optimized structure routes a light beam from the input waveguide to the first output waveguide, when the topology-optimized structure is at a first predetermined temperature that causes the refractive index of the silicon in the topology-optimized structure to assume a first predetermined value, and the topology-optimized structure routes a light beam from the input waveguide to the second output waveguide, when the topology-optimized structure is at a second predetermined temperature that causes the refractive index of the silicon in the topology-optimized structure to assume a second predetermined value that is distinct from the first predetermined value. In some embodiments, one of the two predetermined temperatures is room temperature (e.g., 293 K).

In other embodiments, a thermally modulated photonic switch has one input waveguide and three output waveguides (a 1×3 configuration). In such an embodiment, three distinct predetermined temperatures are chosen, each of which causes the refractive index of the silicon in the TO structure to assume one of three distinct predetermined values. The corresponding refractive index of the silicon, in response to a particular one of the three distinct predetermined temperatures of the TO structure, routes a light beam from the input waveguide to a specific one of the three output waveguides.

The above concepts can be generalized to the construction of a 1×N thermally modulated photonic switch, where N is a natural number greater than or equal to 2. In such an embodiment, N distinct predetermined temperatures are chosen, each of which causes the refractive index of the silicon in the TO structure to assume one of N corresponding distinct predetermined values. The corresponding refractive index of the silicon, in response to a particular one of the N distinct predetermined temperatures of the TO structure, routes a light beam from the input waveguide to a specific one of the N output waveguides.

In still other embodiments, a plurality of alike or similar 1×N thermally modulated photonic switches can act as 1×N switching subunits that are optically interconnected in a cascaded fashion to form a 1×M photonic switch having k stages and $N^k$ outputs (i.e., $M=N^k$). In such an embodiment, a particular 1×N switching subunit at each stage can be thermally controlled to ultimately route a light beam from an input waveguide of the first stage to a specific one of the M output waveguides of the final (output) stage.

In some embodiments, a thermally modulated photonic switch operates with a light beam that lies within the infrared portion of the spectrum. In one embodiment, the wavelength of the infrared light beam is 1550 nanometers (nm). This specific wavelength is merely one example, however.

The foregoing and additional concepts are discussed in greater detail below.

Referring to FIG. 1A, it illustrates a TO structure 100 in a thermally modulated photonic switch, in accordance with an illustrative embodiment of the invention. As explained above, the TO structure 100 is obtained through use of a computerized inverse-design (topology-optimization) process. As shown in FIG. 1A, TO structure 100 includes an input waveguide 110, an output waveguide 120, and an output waveguide 130. As also shown in FIG. 1A, TO structure 100 is made up of dispersed silicon 140 (black) and silicon dioxide 150 (white). The silicon 140 acts as a waveguide to channel/propagate a light beam, whereas the silicon dioxide 150 acts as a cladding to help confine the light beam within the silicon 140. As illustrated in FIG. 1A, the dispersed silicon and silicon dioxide structure produced by the inverse-design process is nontrivial (i.e., it is not a simple geometric structure).

In TO structure 100, the silicon dioxide 150 exhibits a constant refractive index n (e.g., 1.55, in one embodiment). However, the silicon 140 has a refractive index n that can vary by a relatively small factor with temperature. That property of the silicon 140 is exploited by the inverse-design process to produce a TO structure that has the desired characteristics to act as a thermally modulated photonic switch. More specifically, the TO structure 100 being at a first predetermined temperature causes the refractive index n of the silicon 140 in the TO structure 100 to assume a corresponding first predetermined value $n_1$ that routes a light beam entering the input waveguide 110 to a specific output waveguide (e.g., output waveguide 130 in FIG. 1A). Similarly, the TO structure 100 being at a second predetermined temperature causes the refractive index n of the silicon 140 in the TO structure 100 to assume a corresponding second predetermined value $n_2$ that routes a light beam entering the input waveguide 110 to the other of the two output waveguides (e.g., output waveguide 120 in FIG. 1A). Note that, throughout this description, these designations of "first" and "second" are arbitrary.

In one particular illustrative embodiment, the light beam is infrared light with a wavelength of 1550 nm. The first of the two predetermined temperatures is 293 K, at which the refractive index of the silicon 140 is $n_1=3.4757$. Those skilled in the art will recognize that 293 K corresponds to what is commonly called "room temperature." In this embodiment, the second of the two predetermined temperatures is 700 K, at which the refractive index of the silicon 140 is $n_2=3.5648$. Though this change in refractive index n is relatively small, the inverse-design process nevertheless produces a structure in which this slight change in refractive index can be exploited to implement a thermally modulated photonic switch with small dimensions such as 2 microns in width and 4 microns in height. With such a design, a light beam can be routed to either output waveguide 130 or output waveguide 120 by controlling the temperature of the TO structure 100, the selected temperature causing the refractive index of the silicon 140 to be the corresponding predetermined value.

Figure 1B:
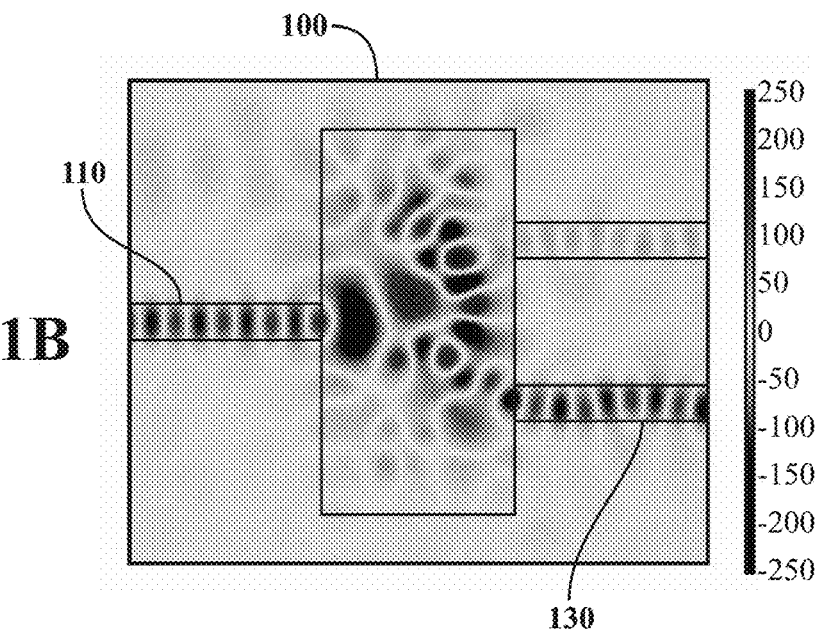
FIG. 1B illustrates a TO structure in a thermally modulated photonic switch when the TO structure is in a first condition associated with a first temperature and a corresponding first refractive index that routes a light beam to a first output waveguide, in accordance with an illustrative embodiment of the invention.
Figure 1C:
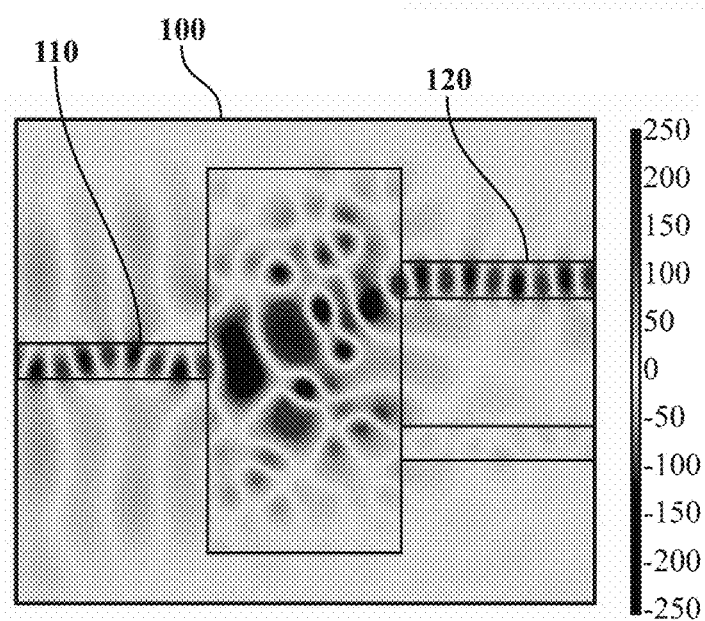
FIG. 1C illustrates a TO structure in a thermally modulated photonic switch when the TO structure is in a second condition associated with a second temperature and a corresponding second refractive index that routes a light beam to a second output waveguide, in accordance with an illustrative embodiment of the invention.

The two fundamental states or conditions of a 1×2 thermally modulated photonic switch in accordance with the principles and techniques disclosed herein are illustrated in FIGS. 1B and 1C.

FIG. 1B illustrates a TO structure 100 in a thermally modulated photonic switch when the TO structure 100 is in a first condition ("Condition 1") associated with a first temperature $T_1$ and a corresponding first refractive index $n_1$ that routes a light beam from input waveguide 110 to a first output waveguide 130 (the lower output waveguide in FIGS. 1B and 1C), in accordance with an illustrative embodiment of the invention. Note that the regions of FIG. 1B with contrasting shading denote the "high" and "low" portions of the light wave (crests and valleys). This particular condition, Condition 1, is referred to again below in connection with a discussion of FIGS. 3A and 3B (cascaded photonic switches).

FIG. 1C illustrates a TO structure 100 in a thermally modulated photonic switch when the TO structure 100 is in a second condition ("Condition 2") associated with a second temperature $T_2$ and a corresponding second refractive index $n_2$ that routes a light beam to a second output waveguide 120 (the upper output waveguide in FIGS. 1B and 1C), in accordance with an illustrative embodiment of the invention. This particular condition, Condition 2, is also referred to again below in connection with a discussion of FIGS. 3A and 3B (cascaded photonic switches).

Figure 2:
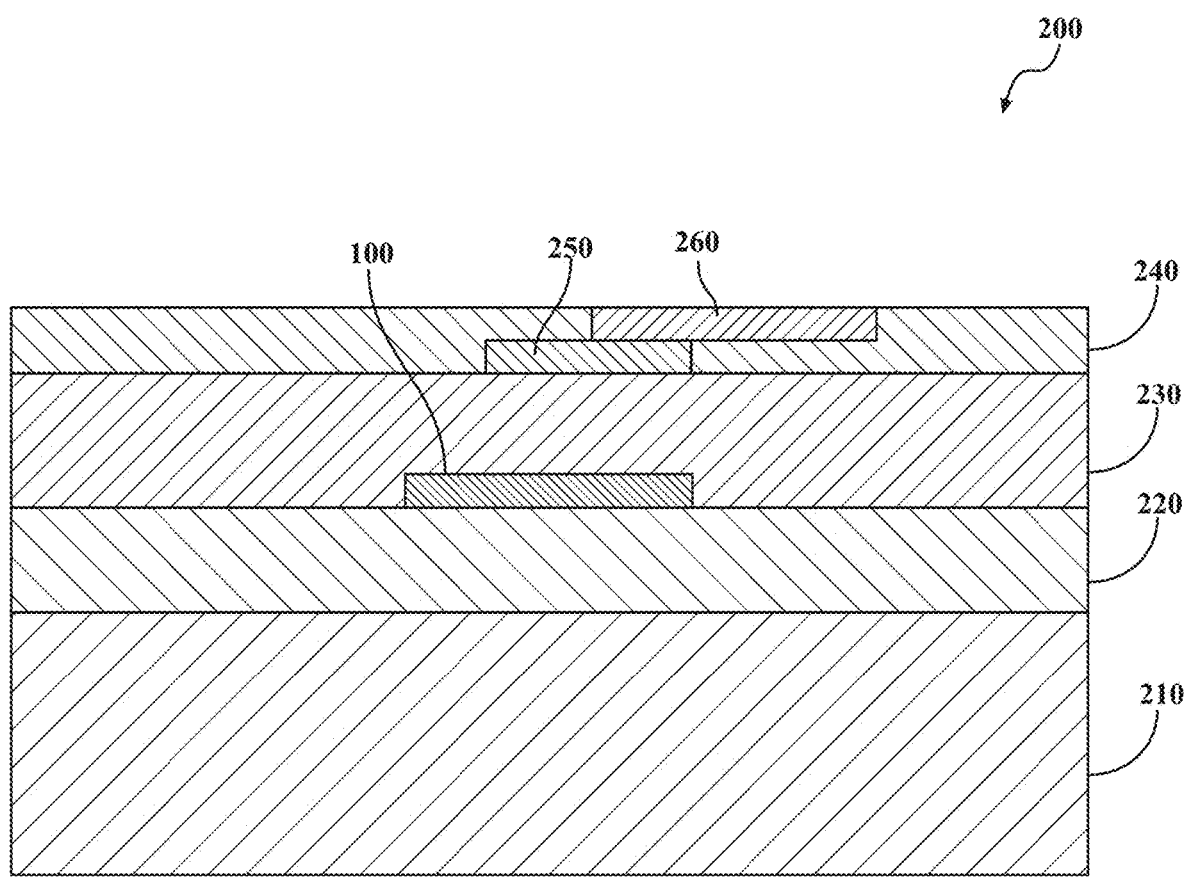
FIG. 2 is a cross-sectional side view of a thermally modulated photonic switch, in accordance with an illustrative embodiment of the invention.

FIG. 2 is a cross-sectional side view of a thermally modulated photonic switch 200, in accordance with an illustrative embodiment of the invention. As illustrated in FIG. 2, photonic switch 200 is an integrated silicon device that includes a plurality of layers made of different materials. Those layers include silicon handle 210, buried thermal oxide layer 220, plasma-enhanced chemical vapor deposition (PECVD) oxide cladding layer 230, and PECVD oxide cladding layer 240. In other embodiments, a type of oxide cladding other than PECVD can be used. As shown in FIG. 2, buried thermal oxide layer 220 is adjacent to and beneath the TO structure 100. Silicon handle 210 is adjacent to and beneath buried thermal oxide layer 220. PECVD oxide cladding layer 230 is adjacent to and on top of buried thermal oxide layer 220, and PECVD oxide cladding layer 230 covers the TO structure 100 on its top and sides. PECVD oxide cladding layer 240 is adjacent to and on top of PECVD oxide cladding layer 230. Note that PECVD oxide cladding layer 240 includes a TiW (titanium-tungsten) alloy heater 250 (a "micro-heater") and a TiW/Al (titanium-tungsten/aluminum) routing layer 260. In some embodiments, a micro-heater of a different type other than one made of TiW alloy can be used. Also, in some embodiments, the routing layer can be made of a material other than TiW/aluminum.

In the embodiment of FIG. 2, the micro-heater (TiW alloy heater 250) is used to control and adjust the temperature of the TO structure 100 and, ultimately, the temperature of the silicon 140 within the TO structure 100 (refer to the discussion of FIG. 1A). As discussed above, controlling the temperature of the TO structure 100 controls the refractive index n of the silicon 140 in the TO structure 100 to route a light beam to the desired output waveguide of the thermally modulated photonic switch 200.

As discussed above, in some embodiments, more than two distinct temperatures for control of the refractive index n of the silicon in the resulting TO structure are selected prior to the inverse-design process that produces a TO structure. In such an embodiment, N>2, and the TO structure routes a light beam from an input waveguide to a particular one of the N output waveguides, when the topology-optimized structure is at a corresponding one of N distinct predetermined temperatures that causes a refractive index n of the silicon in the topology-optimized structure to assume a corresponding one of N distinct predetermined values. For example, a 1×3 thermally modulated photonic switch can be constructed based on three distinct temperatures and three distinct corresponding values of the refractive index n of the silicon in the TO structure. In some embodiments, this 1×3 photonic switch can have similar dimensions to a 1×2 embodiment (e.g., a width of approximately 2 microns and a height of approximately 4 microns). An example of a 1×3 photonic switch being used as a switching subunit in a cascaded configuration is discussed below in connection with FIG. 4. In some embodiments in which N>2, one of the N distinct predetermined temperatures can be room temperature (e.g., 293 K).

As mentioned above, in some embodiments, a plurality of alike or similar 1×N thermally modulated photonic switches in accordance with the principles and techniques described herein can act as 1×N switching subunits that are optically interconnected in a cascaded fashion to form a 1×M photonic switch having k stages and $N^k$ outputs (i.e., $M=N^k$). In such an embodiment, a particular 1×N switching subunit at each stage can be thermally controlled to ultimately route a light beam from an input waveguide of the first stage to a specific one of the M output waveguides of the final (output) stage. Examples of cascaded configurations are discussed below in connection with FIGS. 3A, 3B, and 4.

Figure 3A:
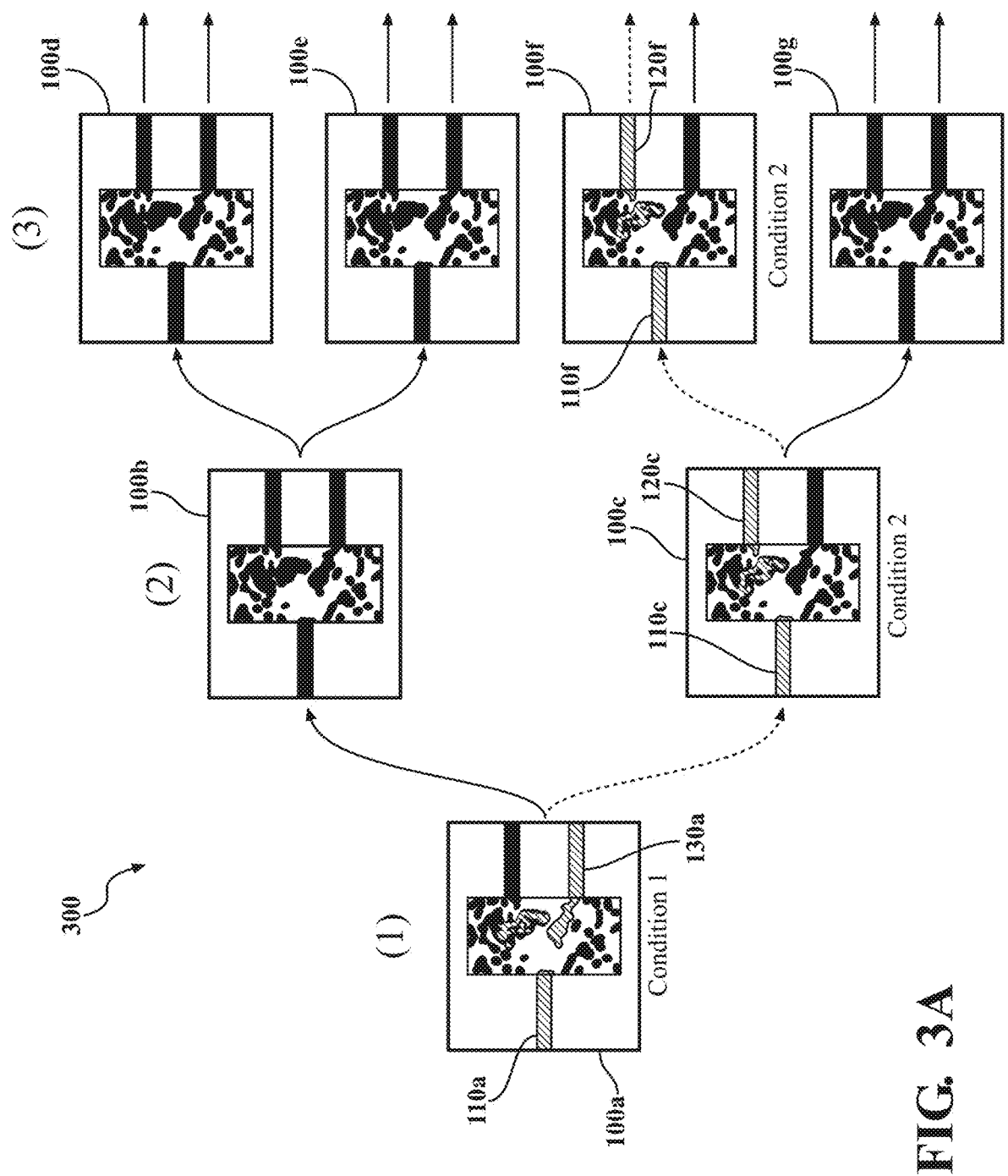
FIG. 3A illustrates a cascaded 1×8 thermally modulated photonic switch in a first illustrative combination of conditions of the three stages, in accordance with an illustrative embodiment of the invention.

FIG. 3A illustrates a cascaded 1×8 thermally modulated photonic switch 300 in a first illustrative combination of conditions of the three stages, in accordance with an illustrative embodiment of the invention. Note that cascaded photonic switch 300 includes three stages (numbered within parentheses in FIG. 3A). Thus, cascaded photonic switch 300 includes $M=N^k=2^3=8$ outputs. In FIG. 3A, the TO structure 100 in one of the 1×2 switching subunits in each stage k has been set to a particular condition ("Condition 1" or "Condition 2," as defined above in connection with the discussion of FIGS. 1B and 1C) to route a light beam from input waveguide 110a of TO structure 100a to output waveguide 120f of TO structure 100f in the last (third) stage. That is, selecting Condition 1 for TO structure 100a in Stage 1 routes the light beam to input waveguide 110c of TO structure 100c in Stage 2. Selecting Condition 2 in TO structure 100c in Stage 2 routes the light beam to input waveguide 110f of TO structure 100f in Stage 3. Selecting Condition 2 for TO structure 100f routes the light beam to output waveguide 120f of TO structure 100f. Counting the outputs of the final stage from top to bottom, output waveguide 120f is Output No. 5 of the 1×8 cascaded photonic switch 300.

Figure 3B:
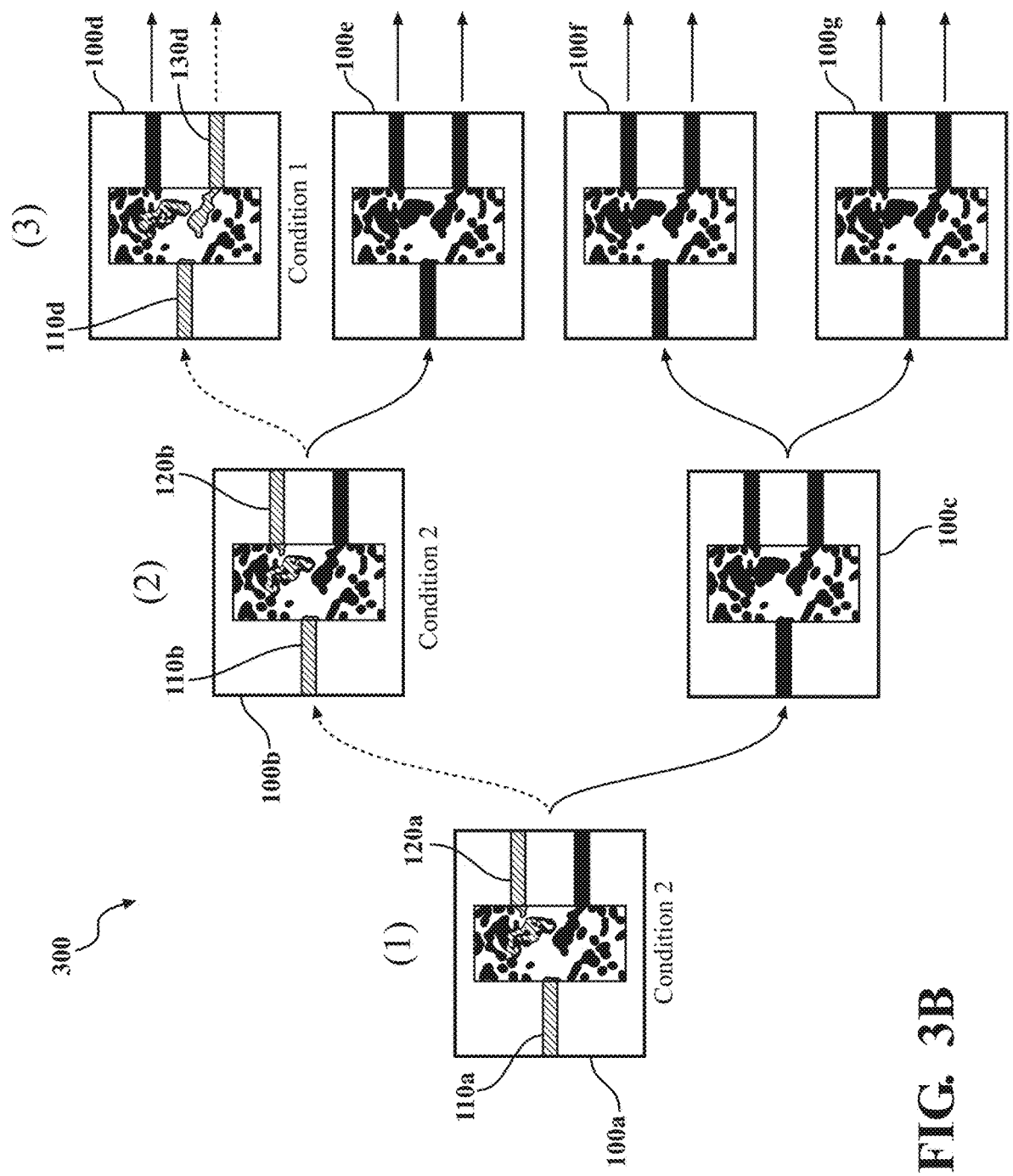
FIG. 3B illustrates a cascaded 1×8 thermally modulated photonic switch in a second illustrative combination of conditions of the three stages, in accordance with an illustrative embodiment of the invention.

FIG. 3B illustrates a cascaded 1×8 thermally modulated photonic switch 300 in a second illustrative combination of conditions of the three stages, in accordance with an illustrative embodiment of the invention. In this example, a light beam is routed from input waveguide 110a of TO structure 100a to output waveguide 130d of TO structure 100d in the third and final stage. That is, selecting Condition 2 for TO structure 100a in Stage 1 routes the light beam to input waveguide 110b of TO structure 110b in Stage 2. Selecting Condition 2 for TO structure 110b in Stage 2 routes the light beam to input waveguide 110d of TO structure 100d in Stage 3. Selecting Condition 1 for TO structure 100d routes the light beam to output waveguide 130d of TO structure 100d. Counting the outputs of the final stage from top to bottom, output waveguide 130d is Output No. 2 of the 1×8 cascaded photonic switch 300.

By selecting the correct combination of states (Condition 1 or Condition 2) at each stage, it is possible to route a light beam from input waveguide 110a of TO structure 100a to any of the 8 outputs of the 1×8 cascaded photonic switch 300.

Figure 4:
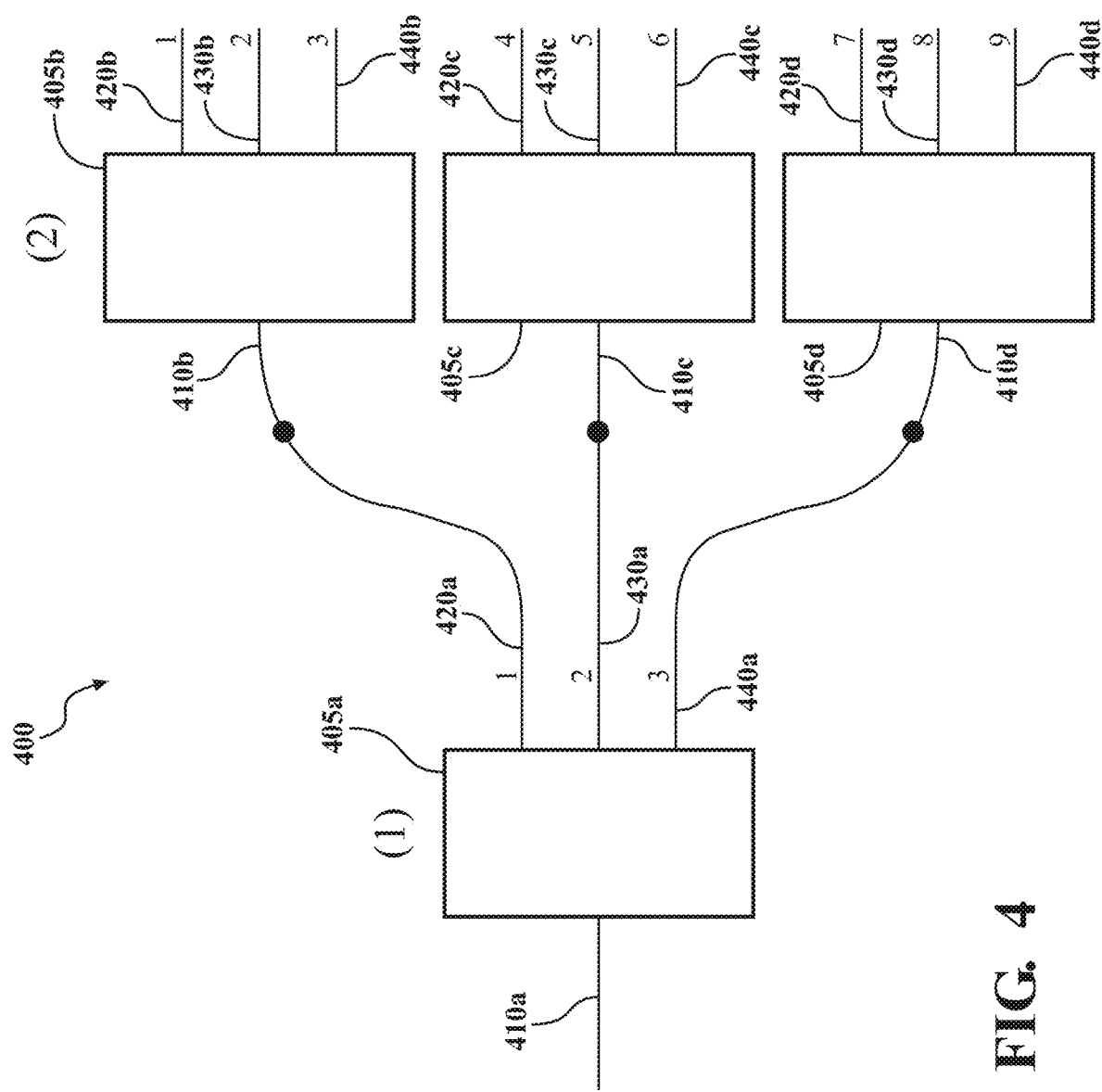
FIG. 4 illustrates a cascaded 1×9 thermally modulated photonic switch, in accordance with an illustrative embodiment of the invention.

FIG. 4 illustrates a cascaded 1×9 thermally modulated photonic switch 400, in accordance with an illustrative embodiment of the invention. Thus, in this embodiment, $M=N^k=3^2=9$ because there are two stages, and each switching subunit is a 1×3 thermally modulated photonic switch. As shown in FIG. 4, a light beam can be input to input waveguide 410a of TO structure 405a. TO structure 405a includes output waveguide 420a, output waveguide 430a, and output waveguide 440a. These are, respectively, connected optically with input waveguide 410b of TO structure 405b, input waveguide 410c of TO structure 405c, and input waveguide 410d of TO structure 405d. TO structure 405b includes output waveguide 420b, output waveguide 430b, and output waveguide 440b. TO structure 405c includes output waveguide 420c, output waveguide 430c, and output waveguide 440c. TO structure 405d includes output waveguide 420d, output waveguide 430d, and output waveguide 440d. In any given 1×3 switching subunit such as TO structure 405a, the temperature can be controlled (e.g., via a micro-heater) to select one of three conditions, Condition 1, Condition 2, or Condition 3 corresponding to the respective refractive indexes and output waveguides of that TO structure. Selecting the correct combination of such conditions at each stage (e.g., via the micro-heaters) makes it possible to route a light beam from input waveguide 410a of TO structure 405a to any of the nine output waveguides (420b-d, 430b-d, and 440b-d) in the second and final stage of cascaded photonic switch 400.

One of the advantages of 1×N thermally modulated photonic switches, as described herein, is that such structures can be scaled easily to create cascaded configurations such as those illustrated in FIGS. 3A, 3B, and 4.

Figure 5:
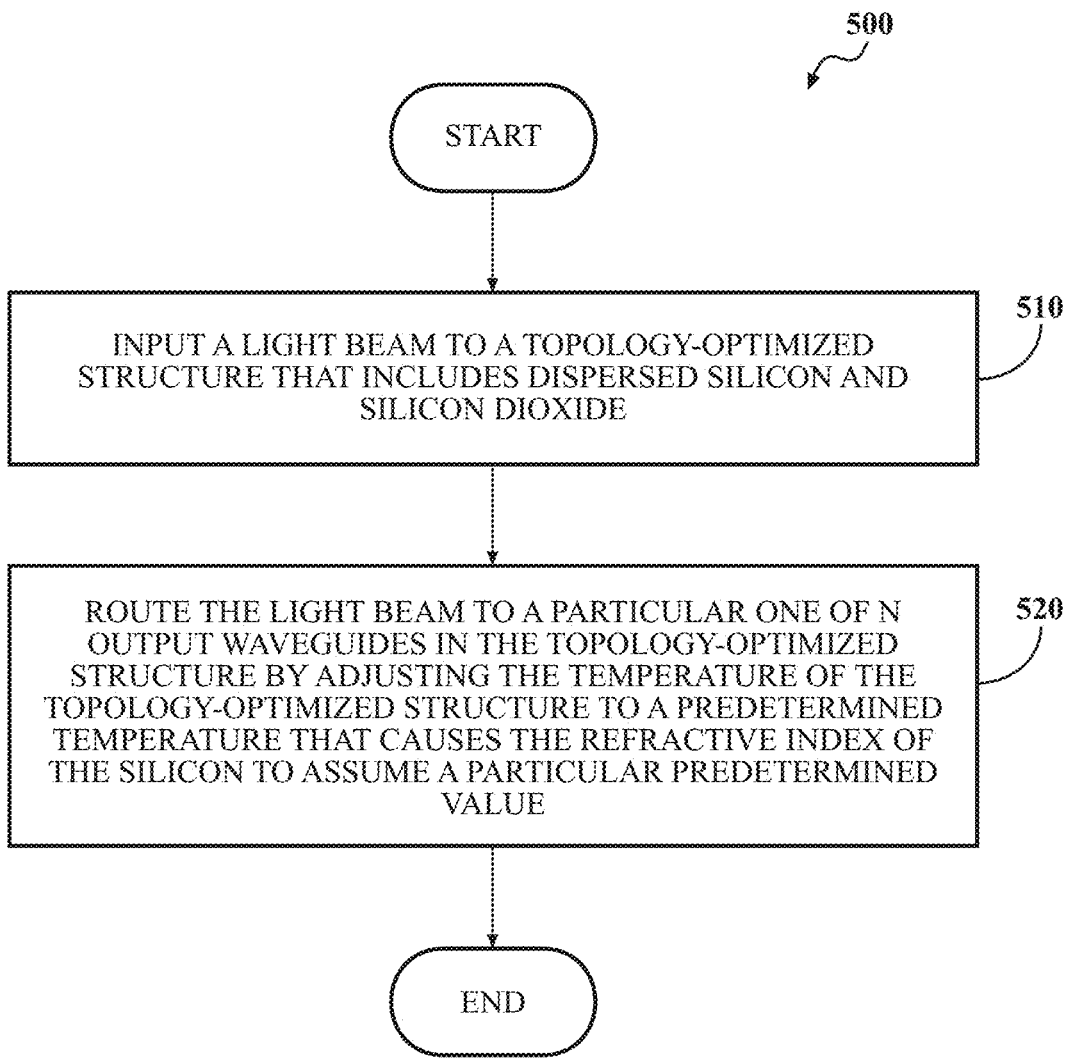
FIG. 5 is a flowchart of a method of thermally modulated photonic switching, in accordance with an illustrative embodiment of the invention.

FIG. 5 is a flowchart of a method 500 of thermally modulated photonic switching, in accordance with an illustrative embodiment of the invention. Method 500 will be discussed from the perspective of the thermally modulated photonic switches shown in FIGS. 1A-4. While method 500 is discussed in combination with these thermally modulated photonic switches, it should be appreciated that method 500 is not limited to being implemented within those specific thermally modulated photonic switches, but those thermally modulated photonic switches are instead examples of apparatuses that may implement method 500.

At block 510, a light beam is input to an input waveguide of a TO structure that includes dispersed silicon and silicon dioxide. As discussed above, such a TO structure includes N output waveguides (outputs), where N is a natural number greater than or equal to 2. In some embodiments N=2 (e.g., the embodiment shown in FIGS. 1A-1C), and in other embodiments N>2 (e.g., the 1×3 TO structures included in FIG. 4). As also discussed above, the TO structure is produced by a computerized inverse-design process that receives, as input, the target performance characteristics of the structure.

At block 520, the light beam is routed from the input waveguide to a particular one of the N output waveguides by adjusting the temperature of the TO structure to a corresponding one of N distinct predetermined temperatures that causes a refractive index n of the silicon in the TO structure to assume a corresponding one of N distinct predetermined values. As discussed above, in some embodiments the temperature of the TO structure is controlled using a microheater (refer to TiW alloy heater 250 in FIG. 2).

In some embodiments, the method 500 shown in FIG. 5 can be extended to include optically interconnecting, in a cascaded fashion, a plurality of alike 1×N switching subunits (1×N thermally modulated photonic switches as disclosed herein) to form a 1×M photonic switch having k stages and $N^k$ outputs. In such an embodiment, the individual topology-optimized structure discussed above in connection with method 500 forms a part of a particular 1×N switching subunit among the plurality of alike 1×N switching subunits (see FIGS. 3A, 3B, and 4).

As discussed above, in some embodiments a given TO structure in a 1×N thermally modulated photonic switch has a width of less than 2.1 microns (e.g., 2 microns) and a height of less than 4.1 microns (e.g., 4 microns).

This description next turns to an overview of the principles and mathematical techniques of inverse design that are used in the various embodiments disclosed herein to produce photonic structures such as TO structure 100. The overview that follows is based on R. Christiansen and O. Sigmund, "Inverse Design in Photonics by Topology Optimization: Tutorial," Journal of the Optical Society of America B, Vol. 38, No. 2, Feb. 2021, pp. 496-509. Additional details and examples regarding inverse design, as applied to photonics, can be found in that publication.

Solving a structural design problem via inverse design has, as its objective, the identification of a structure that maximizes one or more figures of merit without violating any of the constraints inherent in the problem to be solved.

In the discussion that follows, assume a Cartesian coordinate system to model space, such as r={x, y, z} ∈ $\mathbb{R}^3$ in three dimensions and r={x, y} ∈ $\mathbb{R}^2$ in two dimensions, where $\mathbb{R}$ denotes the field of real numbers. To model the underlying physics, a spatially limited modeling domain Ω having an interior $\Omega_I$ and a boundary Γ can be defined.

In the embodiments disclosed herein, the inverse-design problems are treated as being time-harmonic, and any transient behavior is ignored. A time-harmonic exponential factor, $e^{j\omega t}$, is used to model the time dependence, where t represents time, ω represents angular frequency, and j is the imaginary unit.

Given the above framework, the following field equations are used for the electric field $\varepsilon$ and magnetic field $$\mathcal{H} = \frac{1}{\mu_0}\mathcal{B}: \quad (1)$$

$$\nabla \cdot \varepsilon = \frac{\rho}{\varepsilon_r \varepsilon_0}, \nabla \cdot \mathcal{H} = 0, \nabla \times \varepsilon = -\mu_0 \frac{\partial \mathcal{H}}{\partial t},$$

$$\nabla \times \mathcal{H} = J_f + \varepsilon_r \varepsilon_0 \frac{\partial \varepsilon}{\partial t}, \varepsilon = E e^{j\omega t}, \mathcal{H} = H e^{j\omega t},$$

where $J_f$ and ρ represent the free-current and free-charge densities; $\varepsilon_0$ and $\mu_0$ represent the vacuum electric permittivity and the vacuum magnetic permeability, respectively; the symbol $\varepsilon_r$ represents the relative electric permittivity of the medium through which the fields $\varepsilon$ and $\mathcal{H}$ propagate; and the symbols E and H represent the spatially dependent portion of the electric and magnetic fields, respectively.

In some embodiments, the current and charge densities are assumed to be zero in the interior of the model domain. This means that $J_f(r)=0$ and $\rho(r)=0$ for r∈ $\Omega_I$. Based on these assumptions, equations for E and H in $\Omega_I$ can be derived as follows:

$$\nabla \times \nabla \times E(r) - \frac{\omega^2}{c^2}\varepsilon_r(r)E(r) = 0, r \in \Omega_I \subset \mathbb{R}^3 \quad (2)$$

$$\nabla \times \left(\frac{1}{\varepsilon_r(r)}\nabla \times H(r)\right) - \frac{\omega^2}{c^2}H(r) = 0, r \in \Omega_I \subset \mathbb{R}^3. \quad (3)$$

In Eqs. (2) and (3) above, the speed of light in a vacuum is denoted as $$c = \frac{1}{\sqrt{\mu_0 \varepsilon_0}}.$$

In some embodiments, additional problem-specific boundary conditions in addition to Eqs. (2) and (3) can be imposed on the boundary of the model domain Γ to account for external fields and to appropriately truncate it.

In some embodiments, a two-dimensional (2D) model can be applied instead of the above three-dimensional model. That is, material invariance in the out-of-plane direction (i.e., the z direction) can be assumed. Further, in some embodiments, it can also be assumed that the E or H field is linearly polarized in the z direction so that the above relationships can be reduced to the following scalar Helmholtz equation in two dimensions:

$$\mathcal{L}_{EM}(\phi) = \nabla \cdot (a\nabla \phi) + \frac{\omega^2}{c^2}b\phi = 0, r \in \Omega_I \subset \mathbb{R}^2. \quad (4)$$

In embodiments in which it is necessary to model an $E_z$-polarized field ($E_x=E_y=0$) (hereinafter "TE"), $\phi=E_z$, a=1, and b=$\varepsilon_r$. In the case of a problem including an $H_z$-polarized field $H_x$=$H_y$=0) (hereinafter "TM"), $\phi$=$H_z$, $$a = \frac{1}{\varepsilon_r},$$

and b=1. As those skilled in the art will recognize, given the solution to Eq. (4) above, $\varepsilon$ and $\mathcal{H}$ (E and H) can be computed using Eq. (1).

To solve any structural design problem using inverse design, the problem is defined as a continuous constrained optimization problem, which can be express formally as follows:

$$\max_\xi \Phi(\xi),$$

$\Phi$: $[0,1]^{\Omega_d} \to \mathbb{R}$ s.t. $c_i(\xi)=0$, $c_i:[0,1]^{\Omega_d} \to \mathbb{R}$, $i \in \{0,1, \ldots, \mathcal{N}_i\}$, $\mathcal{N}_i \in \mathbb{N}_0$, $c_j(\xi)<0$, $c_j:[0,1]^{\Omega_d} \to \mathbb{R}$, $j \in \{0,1, \ldots, \mathcal{N}_j\}$, $\mathcal{N}_j \in \mathbb{N}_0$.

In problem definition of Eq. (5), $\xi(r) \in [0,1]$ represents a continuous field sometimes referred to as the "design field" with respect to which the function $\Phi$, the figure of merit (hereinafter "FOM"), is to be maximized. In Eq. (5), the $c_i(\xi)=0$ and $c_j(\xi)<0$ relationships denote $\mathcal{N}_i$ equality constraints and $\mathcal{N}_j$ inequality constraints, respectively. In formulating an inverse design problem, it is important to select a FOM (e.g., $\Phi(\xi)$ in Eq. (5)) that reliably measures the performance of the structure being designed. In the thermally modulated photonic switch example, the FOM can be described as maximizing the time averaged power flow from the input waveguide into one of the N output waveguides, depending on the N distinct predetermined temperatures.

Different FOMs could be employed in solving the above illustrative problem, but what they have in common is that they can be written as simple functions of the electric field, the magnetic field, or both evaluated with respect to points, lines, or areas.

Also, the state equation(s) such as Eq. (4) above can be conceptualized as a set of equality constraints as follows:

$$L_k(x_k)=f_k, k \in \{1,2, \ldots, \mathcal{N}_k\}, \mathcal{N}_k \in \mathbb{N} \quad (6)$$

where the $L_k$ operator applies the characteristics of the physical system to the state field $x_k$ for a given excitation $f_k$.

In solving an optimization problem in the form shown above in Eq. (5), the continuous design field $\xi(r)$ is used to interpolate the material parameters modeled by the state equation between the background material(s) and the material(s) constituting the structure under design. Which material interpolation techniques are used depends on the particular problem. In the thermally modulated photonic switch example, the following interpolation functions can be used to interpolate between silicon dioxide and silicon at N distinct predetermined temperatures:

$$\varepsilon_r^N(\xi(r)) = \varepsilon_{r,Si}^N + \xi(r)(\varepsilon_{r,SiO_2} - \varepsilon_{r,Si}^N), \quad (7)$$

where $\varepsilon_{r,Si}^N$ and $\varepsilon_{r,SiO_2}$ represent the relative permittivity of silicon and silicon dioxide, respectively. In this case, $\varepsilon$=0$\Leftrightarrow$$\varepsilon_r$=$\varepsilon_{r,Si}^N$, and $\varepsilon$=1$\Leftrightarrow$$\varepsilon_4$=$\varepsilon_{r,SiO_2}$.

In some computer-software-based inverse-design implementations, gradient-based algorithms are employed. For example, in some embodiments a technique sometimes referred to in the literature as the "Method of Moving Asymptotes (MMA)" is used. MMA is a gradient-based method for solving constrained nonlinear optimization problems. To overcome the computational difficulties associated with finite differences, some embodiments make use of adjoint sensitivity analysis, which requires solving only one equation for the FOM and an additional equation for each constraint in the optimization problem, regardless of how large the design space happens to be. In one embodiment, COMSOL Multiphysics software (https://www.comsol.com/) is used to solve the physics equilibrium, and MATLAB (https://www.mathworks.com/) is used to perform the iterative optimization updates.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-5, but the embodiments are not limited to the illustrated structure or application.

Herein, designations such as "first" or "second" are arbitrary and do not signify priority or importance. Rather, they are used to refer to particular elements among a plurality of elements of the same type (e.g., a set of waveguides, a set of temperatures, a set of refractive indexes, etc.).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A thermally modulated photonic switch, comprising:
a topology-optimized structure that includes dispersed silicon and silicon dioxide, wherein the topology-optimized structure includes an input waveguide, a first output waveguide, and a second output waveguide; wherein:
the topology-optimized structure routes a light beam from the input waveguide to the first output waveguide, when the topology-optimized structure is at a first predetermined temperature that causes a refractive index of the silicon in the topology-optimized structure to assume a first predetermined value; and
the topology-optimized structure routes a light beam from the input waveguide to the second output waveguide, when the topology-optimized structure is at a second predetermined temperature that causes the refractive index of the silicon in the topology-optimized structure to assume a second predetermined value that is distinct from the first predetermined value.

2. The thermally modulated photonic switch of claim 1, further comprising:
   a buried thermal oxide layer disposed adjacent to and beneath the topology-optimized structure;
   a silicon handle disposed adjacent to and beneath the buried thermal oxide layer;
   a first oxide cladding layer adjacent to and on top of the buried thermal oxide layer, the first oxide cladding layer covering the topology-optimized structure; and
   a second oxide cladding layer disposed adjacent to and on top of the first oxide cladding layer, the second oxide cladding layer including a micro-heater and a routing layer.

3. The thermally modulated photonic switch of claim 2, wherein the micro-heater is made of a titanium-tungsten alloy.

4. The thermally modulated photonic switch of claim 2, wherein the micro-heater causes a temperature of the topology-optimized structure to change to one of the first predetermined temperature and the second predetermined temperature.

5. The thermally modulated photonic switch of claim 1, wherein one of the first predetermined temperature and the second predetermined temperature is room temperature.

6. The thermally modulated photonic switch of claim 1, wherein the light beam is infrared light.

7. The thermally modulated photonic switch of claim 6, wherein the infrared light has a wavelength of 1550 nm.

8. The thermally modulated photonic switch of claim 1, wherein the topology-optimized structure is produced by a computerized inverse-design process.

9. The thermally modulated photonic switch of claim 1, wherein the topology-optimized structure has a width of less than 2.1 microns and a height of less than 4.1 microns.

10. A thermally modulated photonic switch, comprising:
    a topology-optimized structure that includes dispersed silicon and silicon dioxide, wherein the topology-optimized structure includes an input waveguide and N output waveguides;
    wherein the topology-optimized structure routes a light beam from the input waveguide to a particular one of the N output waveguides, when the topology-optimized structure is at a corresponding one of N distinct predetermined temperatures that causes a refractive index of the silicon in the topology-optimized structure to assume a corresponding one of N distinct predetermined values.

11. The thermally modulated photonic switch of claim 10, wherein N is equal to 2.

12. The thermally modulated photonic switch of claim 10, wherein N is equal to 3.

13. The thermally modulated photonic switch of claim 10, further comprising:
    a buried thermal oxide layer disposed adjacent to and beneath the topology-optimized structure;
    a silicon handle disposed adjacent to and beneath the buried thermal oxide layer;
    a first oxide cladding layer adjacent to and on top of the buried thermal oxide layer, the first oxide cladding layer covering the topology-optimized structure; and
    a second oxide cladding layer disposed adjacent to and on top of the first oxide cladding layer, the second oxide cladding layer including a micro-heater and a routing layer.

14. The thermally modulated photonic switch of claim 13, wherein the micro-heater causes a temperature of the topology-optimized structure to change to the corresponding one of the N distinct predetermined temperatures.

15. The thermally modulated photonic switch of claim 10, wherein one of the N distinct predetermined temperatures is room temperature.

16. The thermally modulated photonic switch of claim 10, wherein the topology-optimized structure is produced by a computerized inverse-design process.

17. The thermally modulated photonic switch of claim 10, wherein the topology-optimized structure has a width of less than 2.1 microns and a height of less than 4.1 microns.

18. The thermally modulated photonic switch of claim 10, wherein the thermally modulated photonic switch is one 1×N switching subunit among a plurality of alike 1×N switching subunits that are optically interconnected in a cascaded fashion to form a 1×M photonic switch having k stages and $N^k$ outputs.

19. A method of thermally modulated photonic switching, the method comprising:
    inputting a light beam to an input waveguide of a topology-optimized structure that includes dispersed silicon and silicon dioxide, wherein the topology-optimized structure includes N output waveguides; and
    routing the light beam from the input waveguide to a particular one of the N output waveguides by adjusting a temperature of the topology-optimized structure to a corresponding one of N distinct predetermined temperatures that causes a refractive index of the silicon in the topology-optimized structure to assume a corresponding one of N distinct predetermined values.

20. The method of claim 19, further comprising optically interconnecting, in a cascaded fashion, a plurality of alike 1×N switching subunits to form a 1×M photonic switch having k stages and $N^k$ outputs, wherein the topology-optimized structure forms a part of a particular 1×N switching subunit in the plurality of alike 1×N switching subunits.

* * * * *